UNITED STATES PATENT OFFICE.

MYRTIL KAHN AND ANTON OSSENBECK, OF COLOGNE, GERMANY, ASSIGNORS TO SYNTHETIC PATENTS CO., INC., OF NEW YORK, N. Y., A CORPORATION OF NEW YORK.

2.3-OXYNAPHTHOIC-ACID DERIVATIVE.

1,140,747. Specification of Letters Patent. Patented May 25, 1915.

No Drawing. Application filed September 11, 1914. Serial No. 861,280.

*To all whom it may concern:*

Be it known that we, MYRTIL KAHN and ANTON OSSENBECK, doctors of philosophy, chemists, citizens of the German Empire, residing at Cologne, Germany, have invented new and useful Improvements in 2.3-Oxynaphthoic-Acid Derivatives, of which the following is a specification.

We have found that new and technically valuable compounds can be obtained by condensing the 2.3-oxynaphthoic acid with an aminonaphthol, the new products having most probably the following general formula:

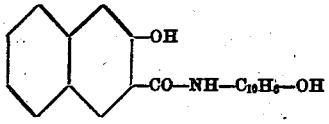

are after being dried and pulverized grayish powders soluble in a hot sodium carbonate solution. Upon unmordanted cotton impregnated with such a solution very valuable full, pure and fast yellowish-red to brownish-red shades are obtained upon treatment with diazo compounds, two molecules of the diazo compound combining on fiber with one molecule of the oxynaphthoylamidonaphthol.

In order to illustrate the new process more fully the following example is given, the parts being by weight: 18.8 parts of 2.3-oxynaphthoic acid are suspended in 100 parts of solvent naphtha together with 15.9 parts of 2.7-aminonaphthol. Subsequently at ordinary temperature 12 parts of phosphorus trichlorid are slowly added. The mixture is then heated in a vessel provided with a reflux condenser until the evolution of hydrochloric acid gas ceases. The mass of the reaction is poured into water and the naphtha is distilled over with steam. The residue is boiled with dilute hydrochloric acid, washed with a cold dilute sodium carbonate solution and is redissolved from a hot dilute sodium carbonate solution. It is a grayish-yellow powder having the formula:

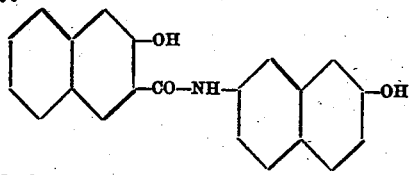

which is soluble in a hot sodium carbonate solution. Upon unmordanted cotton impregnated with this solution diazotized para-nitranilin furnishes fast scarlet-red shades.

Other aminonaphthols, such as 1.6-, 2.6-, 1.7-, 1.4-, 1.3-, or 1.5-aminonaphthols can be used.

We claim:—

1. The new compounds having most probably the following general formula:

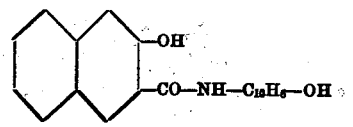

being derived from the 2.3-oxynaphthoic acid and an aminonaphthol, which are after being dried and pulverized grayish powders soluble in a hot sodium carbonate solution; yielding on cotton fiber upon treatment with diazo compounds valuable full, pure and fast yellowish-red to brownish-red shades, substantially as described.

2. The new compound having the formula:

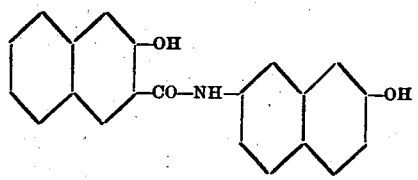

which is a grayish-yellow powder soluble in a hot sodium carbonate solution; yielding on unmordanted cotton impregnated with this solution upon treatment with diazotized para-nitranilin fast scarlet-red shades, substantially as described.

In testimony whereof we have hereunto set our hands in the presence of two subscribing witnesses.

MYRTIL KAHN.
ANTON OSSENBECK.

Witnesses:
A. H. SCHRADER,
F. N. SEELEY.